No. 780,731. PATENTED JAN. 24, 1905.
W. RIOUX.
MEANS FOR ADJUSTING JOURNAL BOX BRASSES.
APPLICATION FILED MAR. 7, 1904.

Witnesses. William Rioux Inventor.
By Marion & Marion
Atty's.

No. 780,731.    Patented January 24, 1905.

UNITED STATES PATENT OFFICE.

WILLIAM RIOUX, OF FALL RIVER, MASSACHUSETTS.

MEANS FOR ADJUSTING JOURNAL-BOX BRASSES.

SPECIFICATION forming part of Letters Patent No. 780,731, dated January 24, 1905.

Application filed March 7, 1904. Serial No. 196,834.

*To all whom it may concern:*

Be it known that I, WILLIAM RIOUX, a citizen of the United States, residing at Fall River, county of Bristol, State of Massachusetts, have invented certain new and useful Improvements in Means for Adjusting Journal-Box Brasses; and I do hereby declare that the following is a full, clear, and exact description of the invention, such as will enable others skilled in the art to which it appertains to make and use the same.

My invention relates to certain new and useful improvements in means for adjusting journal-box brasses, and while especially adapted for use upon looms it is evident that it is applicable to other uses and that the invention is in no wise restricted to use in that class of machines.

The present invention has for its objects, among others, to provide a simple and cheap, yet efficient and effective and reliable, adjusting device by which the journal-brass may be easily and quickly adjusted as occasion may require and the parts firmly held in adjusted position.

The improvement embodies practically but two parts, one having a flange and a tapered body portion and the other a flange and a tapered portion, the two being oppositely disposed, with the tapered faces riding one upon the other, and a nut for engagement with the threaded extension of one of said parts. The said flange of the one part receiving the threaded extension of the other, the parts are practically inseparably connected and not liable to become detached one from the other. Adjustment of the one part with relation to the other adjusts the journal-brass.

Other objects and advantages of the invention will hereinafter appear, and the novel features thereof will be specifically defined by the appended claim.

The invention is clearly illustrated in the accompanying drawings, which, with the numerals of reference marked thereon, form a part of this specification, and in which—

Figure 1:
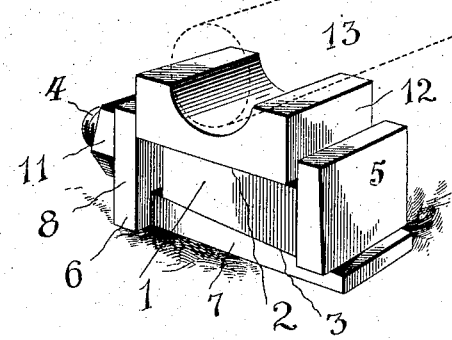
Figure 2:
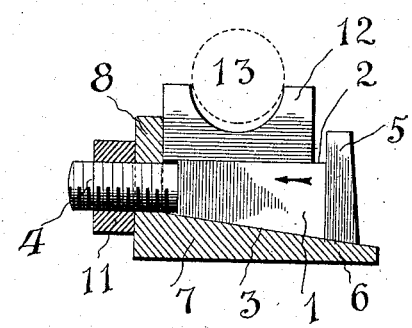
Figure 3:
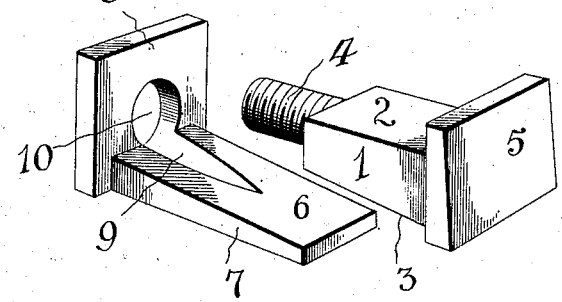

Figure 1 is a perspective view illustrating the application of the invention. Fig. 2 is a vertical longitudinal section through the same. Fig. 3 is a perspective view of the two parts of the improvement separated.

Like numerals of reference indicate like parts in the several views.

Referring now to the details of the drawings, 1 designates a member having a flat upper face 2 and a tapered under face 3. This may be of the required size, depending upon the character of journal with which it is desired to be used, and at one end it is formed with a screw-threaded extension 4 of proper length and at the other end it is formed with a flange 5, extending from the upper face and the two adjacent faces, but not from the lower or taper face.

6 is the coöperating member. It is formed with a tapered body portion 7 and a flange 8, projecting from one end. This flange protrudes from three sides of the said member, and the taper of the body portion may be made more or less, depending upon the character of the uses to which it is to be put.

The upper face of the tapered body portion of the member 6 is recessed, as shown at 9, the said recess being tapered, as shown, and merging into the opening 10 in the flange 8, so that the screw-threaded extension 4 when engaged in the said opening will lie horizontally, seating itself partially in the said recess, as will be readily understood.

11 is a nut engaged with the screw-threaded extension 4 and bearing against the outer face of the flange 8, as seen best in Fig. 2.

Figs. 1 and 2 demonstrate the mode of use. In these views the journal-brass 12 is shown as resting upon the top or flat face 2 of the member 1, 13 being the axle or shaft. As the brass wears the nut is tightened, which draws the member 1 in the direction of the arrow in Fig. 2, its under or tapered face riding upon the upper or inclined face of the member 6, and thus forcing the brass up, the said member being moved sufficiently to compensate for the amount of wear, as will be readily understood. The flanges on the two members serve to hold the brass against lateral movement within certain limits. The recess 9 serves to receive the adjacent portion of the screw-threaded extension of the other member and prevent undue movement thereof laterally.

From the above it will be observed that I have devised a simple and efficient novel form of adjusting device for the purposes specified, and while the structural embodiment of the invention as hereinbefore described is what I at the present time consider preferable it is evident that the same is subject to changes, variations, and modifications without departing from the spirit of the invention, and I therefore do not intend to restrict myself to the details of construction herein shown.

What is claimed as new is—

The adjusting device described consisting of a member having body portion with inclined face and a flange at one end and a screw-threaded extension at the other end, a coöperating member with flange at one end with opening therethrough, and a tapered body portion with inclined recess upon its inclined face merging into said opening, and a nut on the said extension beyond the flange in which said opening is formed, and bearing against the outer face of said flange.

In witness whereof I have hereunto set my hand in the presence of two witnesses.

WILLIAM RIOUX.

Witnesses:
CHARLES ROCHEFORT.
THOMAS CHAREST.